J. W. GAMBLE AND W. S. GIELE.
INTEGRATING AND RECORDING INSTRUMENT.
APPLICATION FILED MAY 6, 1914.
1,305,708.
Patented June 3, 1919.
3 SHEETS—SHEET 2.
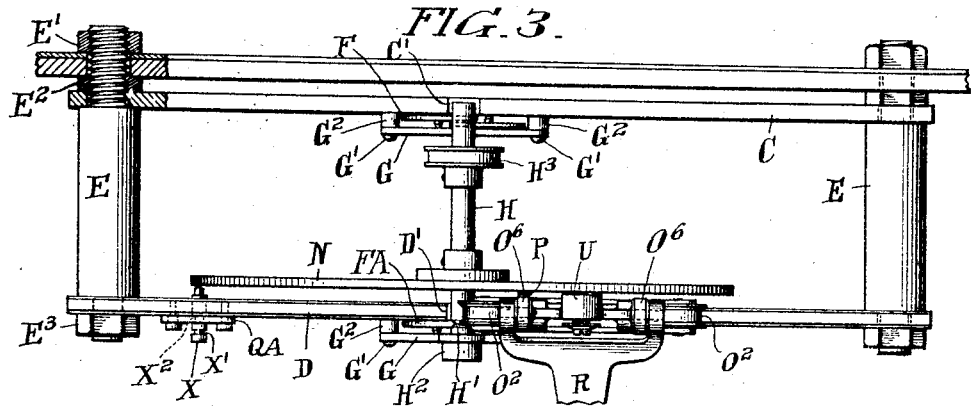
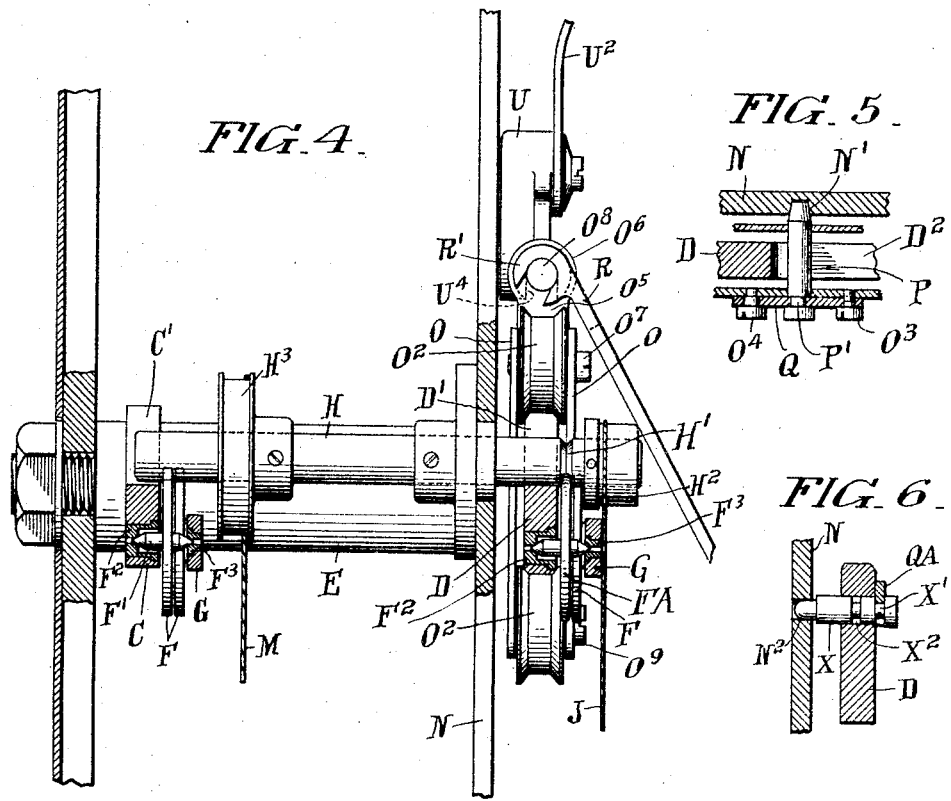

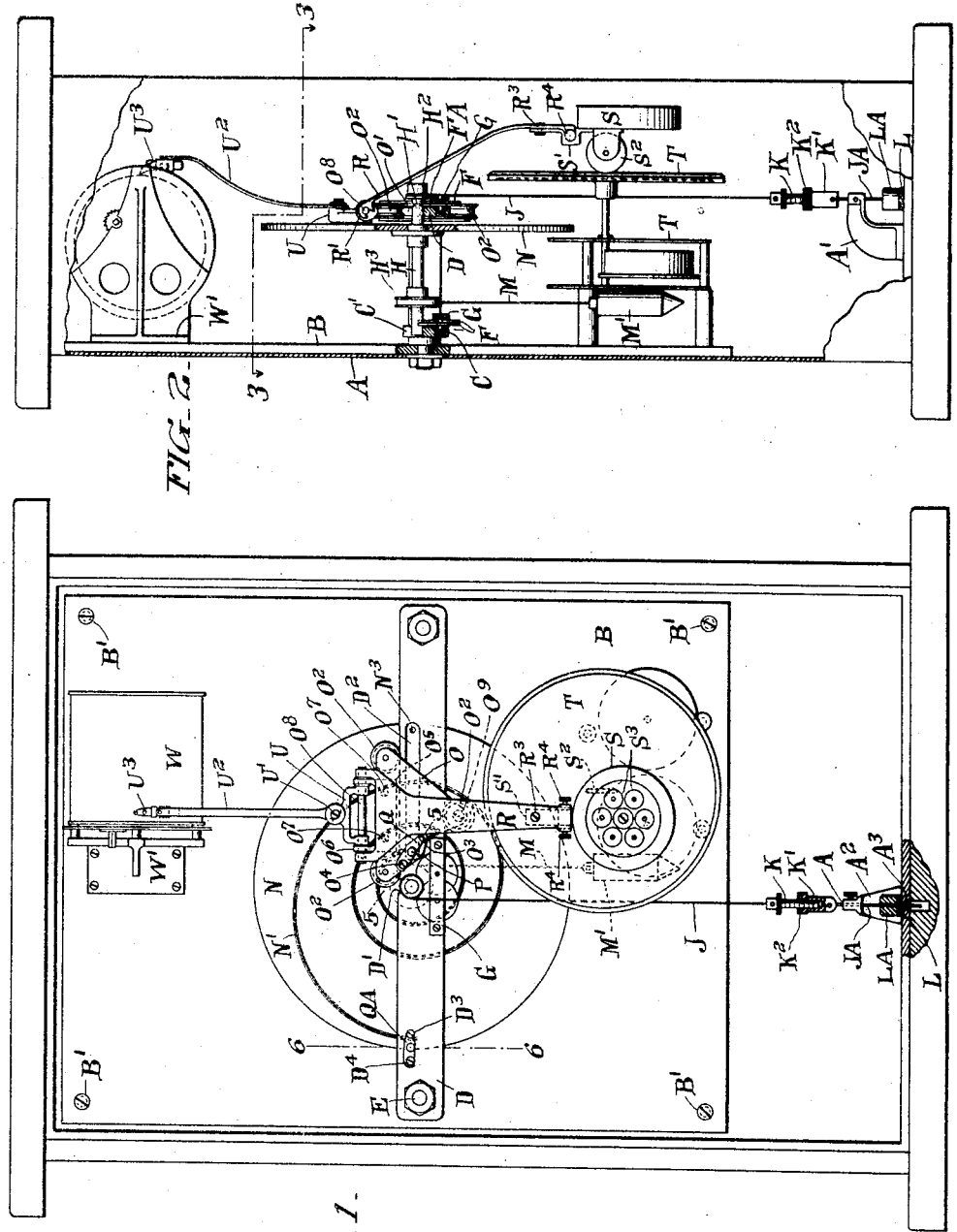

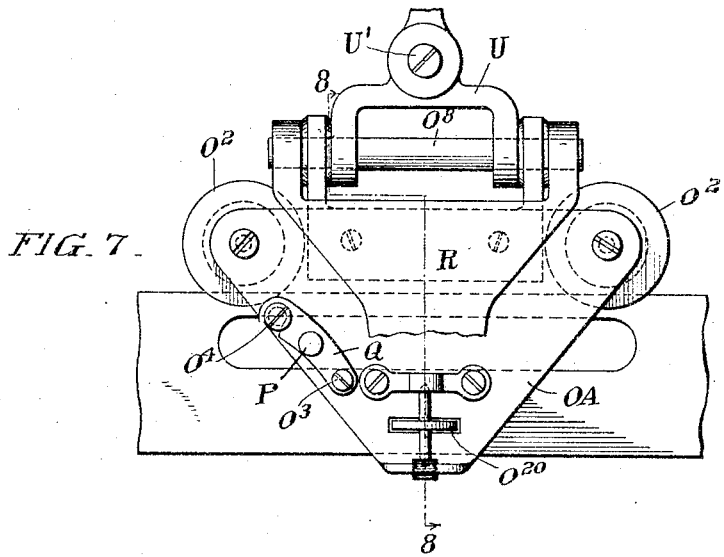
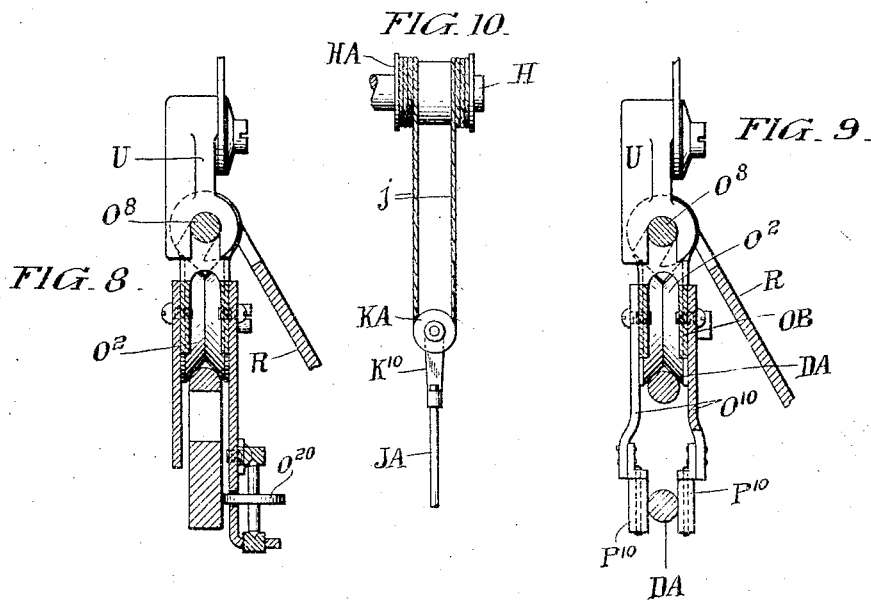

UNITED STATES PATENT OFFICE.

JOSEPH W. GAMBLE AND WALTER S. GIELE, OF PHILADELPHIA, PENNSYLVANIA, ASSIGNORS TO JOSEPH S. LOVERING WHARTON, WILLIAM S. HALLOWELL, AND JOHN C. JONES, ALL OF PHILADELPHIA, PENNSYLVANIA, DOING BUSINESS UNDER THE FIRM NAME OF HARRISON SAFETY BOILER WORKS.

INTEGRATING AND RECORDING INSTRUMENT.

1,305,708.  Specification of Letters Patent.  Patented June 3, 1919.

Application filed May 6, 1914. Serial No. 836,606.

*To all whom it may concern:*

Be it known that we, JOSEPH W. GAMBLE and WALTER S. GIELE, both citizens of the United States of America, and residents of the city and county of Philadelphia, in the State of Pennsylvania, have invented certain new and useful Improvements in Integrating and Recording Instruments, of which the following is a true and exact description, reference being had to the accompanying drawings, which form a part thereof.

Our present invention consists in an improved instrument of the type especially adapted for integrating or recording or, more usually, for both integrating and recording the flow of a liquid over a weir, and including a cam for translating the motion of a float or like device responsive to the accumulation of liquid on the supply side of the weir into motion of some part of the instrument which is in linear proportion to the flow over the weir. Such a motion translating cam is made necessary by the fact that the flow over a weir, while a function of the varying accumulation of water on the supply side of the weir, is, with preferred forms of weirs, not in linear proportion to such accumulation.

The general object of the present invention is to provide an instrument of the kind and for the purpose specified which is simple in construction, reliable and accurate in operation, and may be readily and accurately calibrated.

The various features of novelty characterizing our invention are pointed out with particularity in the claims annexed to and forming a part of this specification. For a better understanding of the invention and of its specific objects and advantages, reference should be had to the accompanying drawings and descriptive matter, in which we have illustrated and described forms in which our invention may be embodied.

Of the drawings:

Figure 1 is a front elevation of our improved instrument with the front door of the casing removed;

Fig. 2 is an end elevation of the instrument shown in Fig. 1, with parts broken away and in section;

Fig. 3 is a sectional plan taken on the line 3—3 of Fig. 2;

Fig. 4 is a partial sectional elevation taken similarly to Fig. 2, but on a larger scale;

Fig. 5 is a section on the line 5—5 of Fig. 1;

Fig. 6 is a section on the line 6—6 of Fig. 1;

Fig. 7 is a partial front elevation illustrating a modified construction;

Fig. 8 is a section on the line 8—8 of Fig. 7;

Fig. 9 is a view taken similarly to Fig. 8, showing still another modification; and Fig. 10 is an elevation illustrating a modification.

The instrument shown in the drawings comprises a casing A, against the vertical back wall of which a base plate B is secured as by the screws B'. A horizontal bar C adjacent the base plate B, and a generally similar bar D in the same horizontal plane but a considerable distance in front of the bar C, are secured to the base plate B and to each other by the bolts or standards E and the nuts E', $E^2$ and $E^3$. The bars C and D are notched at C' and D', respectively, to receive the ends of a shaft H which is journaled on roller bearings supported by the bars C and D. Each of these bearings is formed by a pair of overlapping disks. As shown, the two disks F, forming the rear bearing, and one of the disks F of the front bearing, have cylindrical peripheral surfaces, but the second disk FA of the front bearing is formed with a rounded edge entering a V-shaped circumferential groove H' in the shaft H. The engagement between the disk FA and the walls of the groove H' prevents axial displacement of the shaft H. Each of the disks F and FA is carried by a corresponding shaft F' having conical ends. One end of each shaft F' enters a socket formed in a cup $F^2$ mounted in the corresponding bar C or D, and the opposite end of the shaft enters a socket formed in the cup member $F^3$ mounted in a bar G securely fastened to, but spaced away from the corresponding bar C or D by means of the screws G' and washers $G^2$.

The shaft H has secured to it, adjacent its front end, a drum $H^2$. The upper end of a cable J is secured to the drum $H^2$. The lower end of the cable J is secured to a threaded part K which is adjustably screwed into a member K' formed with a threaded socket. $K^2$ represents a nut for locking the parts K and K' together in any desired adjustment. The member K' is secured to the upper end of the wire or shaft JA which passes through an aperture $A^3$ in the bottom wall of the casing, and beneath the latter is secured to the float or other device (not shown) rising and falling in response to variations in the height of water level on the supply side of the weir. To prevent dust or moisture from entering the casing through the aperture $A^3$, a washer L of felt is placed above the aperture $A^3$ and an annular weight LA resting on this washer holds the latter snugly about the wire or shaft JA which pierces the washer L.

To wind up the cable J on the drum $H^2$ as the float actuating rod JA rises, while permitting the cable J to unwind as the rod JA descends, we secure a second drum $H^3$ to the shaft H adjacent the rear end of the latter, and attach to this drum the cable M which supports a weight M'. The weight M' and cable M tend to rotate the shaft H in a direction to wind up the cable J. The shaft H also has mounted on it the cam disk N, which is formed on its front side with a spiral cam N', which might be a rib, but, as shown, is a groove. The cam disk may well be made of aluminum and so designed as to minimize its weight, so that its inertia will be small. The cam groove N' receives the inner end of a pin P which is mounted in a carriage O.

As shown, the carriage O comprises triangular plates O', placed one in front and one back of the bar D, and having journaled therein two rollers $O^2$ running on the top of the bar D, and one roller $O^2$ bearing against the bottom edge of the bar D. As shown, the pin P passes loosely through a slot $D^2$ in the bar D, and is normally held in the position in which it enters the cam groove N' by a latch member Q which is pivotally mounted on the pin $O^3$ secured to the carriage O, and is formed with an open eye or slot adapted to take over the pin $O^4$ secured to the carriage O, and with another open eye or slot, the edges of which are adapted to enter the groove P' formed in the pin P. When the latch Q is lifted, the pin P may be withdrawn from operative engagement with the cam groove N'. The slot $D^2$ and the line of travel of the pin P is preferably radial to the cam disk N, as shown, and the carriage and disk are in close proximity to one another, both features contributing to an easy movement of the carriage O by the cam disk N. A block $O^5$ secured between the plates O' above the bar D, as by means of the screws $O^7$, is formed with ears $O^6$ in which are mounted a shaft $O^8$.

The carriage O supports a part of the integrating mechanism of the instrument through a hanger R, which is formed with a pair of slotted ears R' adapted to take over the ends of the shaft $O^8$. To the lower end of the hanger R is secured a casing S inclosing a train of counting wheels and supporting the actuating wheel $S^2$ for these counting wheels. $S^3$ represents the dials of the counting train. As shown, the casing S is formed with an arm S' pivotally connected to the hanger R at $R^3$ and capable of adjustment with respect to the hanger about the axis of said pivotal connection by means of the adjusting screws $R^4$. The actuating wheel $S^2$ bears against the face of a disk T, which is constantly rotated by the clock mechanism T', secured to the base plate B. The face of the disk T is some distance in front of the bar D, and in consequence the actuating wheel $S^2$ of the integrating mechanism is gravity held against the face of the disk T, thus insuring a constant contact pressure and frictional driving connection between the actuating wheel $S^2$ and the disk T.

A member U is journaled on the shaft $O^8$ between the ears $O^6$. Advantageously, as shown, the member U is formed with open eyes or slots $U^4$ which receive the shaft $O^8$ thus permitting the member U to be lifted off the shaft $O^8$ whenever this is desirable. Adjustably secured to the member U, as by means of the clamping screw U', is the arm $U^2$, which carries at its upper end a marking device $U^3$ in the form of the usual pen for tracing a record on the drum W. The latter surrounds and is rotated by a clock driving mechanism supported from the base plate by the bracket W' secured to the latter. The member U has its center of gravity to the rear of the axis of the shaft $O^8$ and is of the proper weight to hold the pen $U^3$ against the record drum W. A pin X is mounted in the bar D in position to be inserted in one or the other of the holes $N^2$ and $N^3$ formed in the disk N adjacent the periphery of the latter, when it is desired to hold the disk N against movement. As shown, the pin X is formed with two notches X' and $X^2$, one or the other of which receives the latch QA, accordingly as the pin X is advanced to enter the hole $N^2$ or hole $N^3$ or is retracted to permit the disk N to rotate. The latch QA, which is similar to the latch Q, is pivotally connected to the bar D by the pin $D^3$, and $D^4$ represents a pin secured to the bar D and over which the open ended slot in the free end of the latch QA normally passes.

In operation, as the rod JA is moved up and down by the float or other actuating device to which it is connected, a corresponding rotary movement is imparted to the cam disk N. The rotation of the latter imparts movement to the carriage O along the bar D on which it is mounted. The simultaneous movements of the rod JA and carriage O are not in linear proportion, however, but are in a proportion determined by the law of the cam groove N'. The cam groove N' should be shaped in accordance with the law of flow over the weir so that the movement of the carriage O will be in linear proportion to the rate of flow over the weir. Where the apparatus is used, for instance, in obtaining a measure of the flow through a V-notched weir, the movement of the carriage O should be approximately proportional to the five-halves power of the movement of the rod JA, in order that the displacement of the carriage O from its no flow position at any instant may be in linear proportion to the rate of flow through the weir notch at that instant. The integrating mechanism and the recording mechanism should be so adjusted that when the carriage O is in its no flow position, the recording pen $U^3$ will engage the record sheet or surface at the zero or base line, and the actuating wheel $S^2$ of the counting train will be in a position in which the rotation of the disk T will not tend to rotate the wheel $S^2$. In the particular arrangement shown the wheel $S^2$ engages the disk T at the center of the latter in the no flow condition of the apparatus.

The provisions described permit a very accurate calibration of the apparatus to be made. When the float or other actuating device for the rod JA has been brought into the zero flow position, the rod JA may be clamped in the corresponding position by means of the bracket $A^2$ and set screw $A^3$. This enables the rest of the apparatus to be adjusted without thereby disturbing the zero flow position of the rod JA. As the next step in the calibration of the instrument, the parts K and K' may be adjusted as required to bring the cam disk N into its zero flow position. The opening $N^2$ in the cam disk N is so located that it registers with the pin X when the cam disk is in its zero flow position, and the disk may be locked in said position by sliding the pin X into the opening $N^2$. With the disk N thus locked in the zero flow position, it is a simple matter to adjust the connections between the counting train casing S and the hanger R, and between the member U and the arm $U^2$ to bring the wheel $S^2$ into the position in which its axis intersects the axis of the disk T, and to bring the pen $U^3$ onto the base line of the record surface.

It will be apparent to those skilled in the art that the instrument shown is comparatively simple and inexpensive in construction, and the frictional resistance to the movement of the movable parts is relatively small. The instrument is capable of ready adjustment and accurate calibration, and is not liable to get out of operative condition. In the instrument shown one cam disk N may be readily replaced by another of different contour to adapt the instrument for use with weir measuring apparatus in which the variations of flow for given differences in height of liquid level are different.

By the simple replacement of a winding drum $H^2$ of one diameter by a generally similar drum of a different diameter, the recording apparatus shown can be used with weir meters in which the maximum variation in height of liquid level on the supply side of the weir is different, while at the same time the full area of the record chart may be utilized in each case. For instance, with the apparatus shown, two and one-half revolutions of the shaft H and cam N are required to give the recording point its maximum range of movement transverse to the direction of movement of the record chart. If the meter with which the recording instrument is used is so operated that the maximum variation in the height of liquid level on the supply side of the weir is twelve inches, say, then the diameter of the winding drum $H^2$ should be such that a float movement of twelve inches will give two and one-half turns to the shaft H. Should the same recording mechanism be used without change in connection with a weir meter in which the maximum variation in height of water level on the supply side of the weir is only six inches, the maximum displacement of the record line from the base line would be appreciably less than the dimensions of the chart would permit. By replacing the drum $H^2$ originally employed by another of half the diameter, however, the maximum range of movement of the recording point would be the same with a six inch float movement as it had previously been with a twelve inch float movement. It is of course desirable to utilize as much of the record chart as is feasible with a given apparatus, since the larger the curve variations actually traced, the easier the record is to read and the more fully and accurately may the flow be computed therefrom.

The hanger R and attached parts, and the part U may be quickly lifted off the shaft $O^8$ whenever it is desired to disassemble the instrument, and by removing the pintle $O^9$ for the lower roll $O^2$ and withdrawing the pin P from the carriage O, the latter may be lifted off the bar D. The opening $N^3$ is so located that when entered by the pin X, the cam disk N is locked in its maximum flow position which is sometimes desirable in calibrating the instrument.

To permit the cam actuated carriage to be still more readily removed from its supporting guide, we may employ the construction shown in Figs. 7 and 8. The carriage OA of Figs. 7 and 8 only differs materially from the carriage O previously described, in the omission of the lower roll O² of the latter and in the addition of a roller O²⁰ which bears against the front side of the guide bar D adjacent the lower edge of the latter. With the arrangement shown in Figs. 7 and 8, a pull is exerted on the carriage through the arm R having a component which holds the roller O²⁰ against the guide D and is balanced by the reaction between said guide and roller. With the construction shown in Figs. 7 and 8, the withdrawal of the pin P is all that is required to permit the carriage OA to be lifted off the guide D.

In the arrangement shown in Fig. 9, the carriage OB differs from the carriage O already described in that each side frame or plate O¹⁰ of the carriage OB, corresponding to the plates O' of the carriage O, is provided adjacent its lower end with bearings for rolls P¹⁰ the axes of which extend transversely to the line of movement of the carriage and to the axes of the rollers O². The carriage OB is shown as running on a guideway or track formed by two parallel rods DA. The carriage OB can be removed from and placed back on its supporting track quite as easily as can the carriage OA, and in addition the carriage OB is adapted to resist a torque tending to turn it in either direction about an axis parallel to the length of the supporting track.

In the modification shown in Fig. 10, the winding drum HA, replacing the drum H' described above, has connected to it both ends of the flexible element $j$. In the bight of the latter is received a pulley KA, to the yoke K¹⁰ of which is secured the upper end of the float rod JA. With this arrangement, the two sides of the bight of the member $j$ tend to remain in the same plane at all times and this checks the tendency sometimes experienced for the float rod JA to rotate on its own axis.

While in accordance with the provisions of the statutes, we have illustrated and described the best forms of our invention now known to us, it will be apparent to those skilled in the art that changes may be made in the forms of apparatus described without departing from the spirit of our invention, and that under some conditions certain features of our invention may be used without a corresponding use of other features.

Having now described our invention, what we claim as new and desire to secure by Letters Patent, is:

1. In an instrument of the kind described, the combination with the float stem, motion translating cam, an adjustable connection through which said float stem imparts movement to said cam, a carriage moved by said cam and means for releasably securing said cam in a predetermined position to facilitate calibration.

2. In an instrument of the kind described, the combination with a horizontal revoluble cam shaft, of a cam disk carried thereby and provided with a spiral motion translating cam way on its face, a supporting framework for said shaft including a bar extending across the face of said cam disk and formed with a horizontal upper edge and with a slot beneath said edge, a carriage mounted on said bar and having wheels running on its upper edge, and a member supported by said carriage at each side of said bar which extends through said slot and engages said cam way.

3. In an instrument of the kind described, the combination with a horizontal revoluble cam shaft, of a cam disk carried thereby and provided with a spiral motion translating cam way on its face, a supporting framework for said shaft including a bar extending across the face of said disk and having a horizontal upper edge above the axis of said shaft and formed with a slot extending radially outwardly from the axis of said shaft, a carriage mounted on said bar and having wheels running on its upper edge and also having a guiding engagement with said bar below said slot, and a removable pin supported by said carriage at each side of said bar which extends through said slot and engages said cam way.

4. In an instrument of the kind described, the combination of a revoluble horizontal shaft, a spiral motion translating cam carried thereby and a supporting framework for said shaft including a bar notched to receive one end of said shaft, rolls journaled on said bar to turn about spaced apart horizontal axes and forming a roller support for said shaft, and a carriage mounted on said bar and moved along the latter by said cam.

5. In an instrument of the kind described, the combination with a motion translating cam, of a carriage moved by said cam and including an adjustable arm, flow exhibiting means in coöperative relation with said arm, and means for releasably securing said cam in predetermined position to facilitate calibration.

JOSEPH W. GAMBLE.
WALTER S. GIELE.

Witnesses:
ROBERT G. CLIFTON,
M. M. FULTON, Jr.